United States Patent
Wieland et al.

(10) Patent No.: US 10,279,633 B2
(45) Date of Patent: May 7, 2019

(54) TREAD FOR A SNOW TIRE

(71) Applicant: The Goodyear Tire & Rubber Company, Akron, OH (US)

(72) Inventors: Richard Mark Wieland, Akron, OH (US); Michael Stefan Skurich, North Canton, OH (US); Michael Geno Cicchiani, Macedonia, OH (US); Dale Edward Umstot, Atwater, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 288 days.

(21) Appl. No.: 15/375,553

(22) Filed: Dec. 12, 2016

(65) Prior Publication Data

US 2018/0162174 A1    Jun. 14, 2018

(51) Int. Cl.
*B60C 11/13* (2006.01)
*B60C 11/03* (2006.01)

(52) U.S. Cl.
CPC ...... *B60C 11/1307* (2013.01); *B60C 11/0302* (2013.01); *B60C 11/0309* (2013.01); *B60C 11/1353* (2013.01); *B60C 2011/0341* (2013.01); *B60C 2011/0358* (2013.01); *B60C 2011/1338* (2013.01); *B60C 2011/1361* (2013.01)

(58) Field of Classification Search
CPC ............. B60C 11/1307; B60C 11/1353; B60C 11/0309; B60C 11/0316; B60C 2011/1338; B60C 2011/1361; B60C 11/042; B60C 11/045; B60C 11/047; B60C 2011/0341; B60C 2011/0358; B60C 11/24; B60C 11/246

USPC ........................................ 152/209.19, 209.22
See application file for complete search history.

(56) References Cited

U.S. PATENT DOCUMENTS

| | | | | |
|---|---|---|---|---|
| 2,268,344 | A | * | 12/1941 | Shesterkin .......... B60C 11/0309 152/209.18 |
| 4,690,189 | A | | 9/1987 | Bradisse et al. |
| 5,176,766 | A | | 1/1993 | Landers et al. |
| 5,259,429 | A | * | 11/1993 | Harms .................... B60C 11/01 152/209.12 |
| 5,503,206 | A | | 4/1996 | Consolacio et al. |
| 5,538,060 | A | | 7/1996 | van der Meer et al. |

(Continued)

FOREIGN PATENT DOCUMENTS

| | | | | |
|---|---|---|---|---|
| JP | 61-81206 | * | 4/1986 | ............. B60C 11/04 |
| JP | H0699705 A | | 4/1994 | |
| WO | WO 2015/135928 | * | 9/2015 | ......... B60C 11/1353 |

OTHER PUBLICATIONS

JP 61-81206 English language machine translation [epo.org] (Year: 1986).*

(Continued)

*Primary Examiner* — Eric Hug
(74) *Attorney, Agent, or Firm* — Robert N. Lipcsik (57) ABSTRACT

A pneumatic tire has a radially outer tread. The tread has a plurality of circumferential grooves, a plurality of lateral grooves, and a plurality of shoulder grooves. The tread includes bottoms and sides of each circumferential groove being textured for improving snow traction, each circumferential groove being textured with flat-topped pyramids, bottoms and sides of each lateral groove being textured for improving snow traction; and bottoms and sides of each shoulder groove being textured for improving snow traction.

1 Claim, 13 Drawing Sheets

(56) References Cited

U.S. PATENT DOCUMENTS

| | | | |
|---|---|---|---|
| 5,891,276 A | 4/1999 | Takahashi | |
| 5,957,179 A | 9/1999 | Graas | |
| 6,378,583 B1 | 4/2002 | Fontaine | |
| 6,415,835 B1 * | 7/2002 | Heinen | B60C 11/0309 152/209.21 |
| 6,443,199 B1 | 9/2002 | Scarpitti et al. | |
| 6,866,076 B2 * | 3/2005 | Ohsawa | B60C 11/13 152/209.21 |
| 7,004,216 B2 * | 2/2006 | Godefroid | B60C 11/0309 152/209.18 |
| 8,261,790 B2 | 9/2012 | Wen et al. | |
| 8,776,847 B2 * | 7/2014 | De Benedittis | B60C 11/13 152/209.21 |
| 2001/0032691 A1 | 10/2001 | Ohsawa | |
| 2009/0194211 A1 | 8/2009 | Howald | |
| 2009/0194212 A1 | 8/2009 | Bonko et al. | |
| 2009/0218019 A1 * | 9/2009 | Paturle | B29C 33/424 152/209.18 |
| 2011/0125465 A1 * | 5/2011 | Buresh | B60C 11/0311 703/1 |
| 2015/0083306 A1 * | 3/2015 | Colby | B60C 11/1369 156/96 |
| 2016/0121658 A1 * | 5/2016 | Skurich | B60C 11/0327 152/209.18 |
| 2017/0066292 A1 | 3/2017 | Cambon | |
| 2017/0072749 A1 * | 3/2017 | Muhlhoff | B60C 11/00 |

OTHER PUBLICATIONS

European Search Report dated Apr. 9, 2017 for Application Serial No. EP17206381.

* cited by examiner

TREAD FOR A SNOW TIRE

FIELD OF THE INVENTION

The present invention generally relates to tread patterns for pneumatic passenger or light truck tires, and, particularly, to a tread for enhancing snow traction.

BACKGROUND OF THE INVENTION

A pneumatic tire includes a ground contacting portion or tread, the tread having a pattern designed to provide the tire with a desirable combination of traction, durability, ride comfort, and quiet operation. It is also desirable that the tread pattern provide the tire with an all-weather capability or a set of characteristics providing adequate performance under a variety of adverse road conditions including dry, snow, ice, rain, and mud.

The all season tire has been introduced by The Goodyear Tire and Rubber Company many decades ago and was defined by lateral extending grooves open to the side of the tread. These lateral extending grooves were oriented perpendicular to the direction of travel for at least 0.5 inches and a width of at least 0.06 inches from the open shoulder laterally inward and provided a huge improvement in snow traction, virtually reducing the need for snow tires except in the most extreme weather conditions.

Tire tread patterns designed for traction on wet surfaces, snow, and ice often feature a block type tread pattern. A block type tread pattern is characterized by a plurality of main grooves extending in a circumferential direction and a number of lateral grooves extending in a more or less axial direction. The areas of the tread between the circumferential and lateral grooves are referred to a tread blocks. Tread blocks may also be defined by the edges of the tread and by grooves having other orientations. In comparison, a rib-type tread pattern may be characterized primarily by circumferential grooves separating circumferentially continuous ribs. Tread designs may also combine rib and block patterns.

The use of blocks as elements of a tread pattern tends to increase the level of noise generated by such tires, as compared to rib-type tires. Such blocks may produce irregular wear due to their lack of stiffness in the circumferential direction of the tread. It is known in pneumatic tires having a block tread pattern that normal operation of the tire produces uneven wear of the tread blocks called heel-and-toe wear. In heel-and-toe wear, the rate of wear at the toe or trailing edge of the blocks may exceed the rate of wear at the heel or leading edge of the blocks. In normal operation, the heel of each block may strike the pavement first followed by the toe. Similarly the heel of each block may be lifted first from its contact with the pavement followed by the toe. In addition to reduced tread life, irregular and heel-and-toe wear may increase the level of noise generated by operation of the tire. Also, the cornering and braking performance of a tire with irregular and/or heel-and-toe wear may be degraded.

Another tread pattern may suppress heel-and-toe wear by providing a narrow tread block axially outside each block. The narrow block may have a surface formed to be a circular arc by setting both end parts of the narrow block lower than the adjacent tread block by 1.5 to 2.5 mm To balance the rate of heel and toe wear, the leading edge or heel of one or more blocks may have one or more notches with a variable width in the axial direction. The width may generally decrease from a maximum at the heel to a minimum in the direction of the toe. The notches may provide the tread blocks with a variable net to gross where the net to gross increases from the heel to the toe of the blocks.

Figure 3:
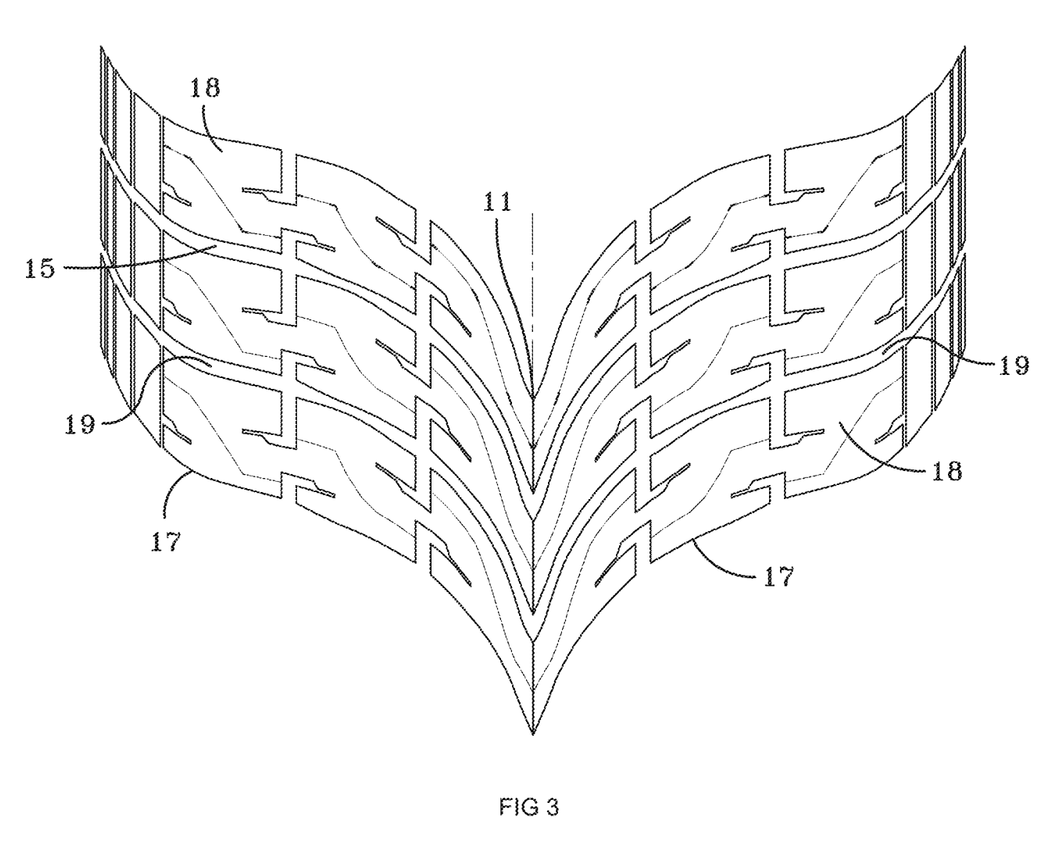
FIG. 3 is a schematic exemplary portion of a directional tread pattern.

An "aqua-channel" large circumferential groove with a width 7 to 12 percent of the tread width combined with a network of generally curved inclined lateral grooves flowing over the tread shoulders may also greatly enhance wet traction. As shown in FIG. 3, the aqua-channel may be connected to curved lateral grooves and water may be directed into a large groove and into the lateral grooves to be expelled through a channel or through the lateral grooves.

These directional treads should not have the lateral grooves oriented such that water is directed to the center of the tread. Therefore, the orientation is such that the axially inner portions of a lateral groove and the leading edges and trailing edges of the tread elements must enter the footprint or contact patch prior to the axially outer portions. Accordingly, any inclination other than 90 degrees may be inclined or sloped away from the contact patch as the grooves extend axially outwardly. These constructions have been found to contribute to irregular heel toe wear in shoulder block elements. This irregular wear may be exaggerated or reduced depending on the shape of the tire's footprint or contact patch shape.

Another tread pattern may produce a footprint shape which, regardless of load, may operate in a range of footprint shape factors that permit tire treads to be optimized thereby omitting tire rotation requirements. A tire's footprint may thus be measured and a footprint shape factor (FSF) may be calculated. To measure the footprint shape, a tire may be inked and pressed against a paper or a cardboard sheet or laid on a flat hard surface at a fixed load with the tire inflated at a fixed pressure leaving the impression of the tread on the paper or cardboard surface. Alternatively, inkless procedures may include carbonless paper, pressure sensing pads, and the like. In all cases, the objective is to define tread contacting surfaces within the footprint.

Figure 1:
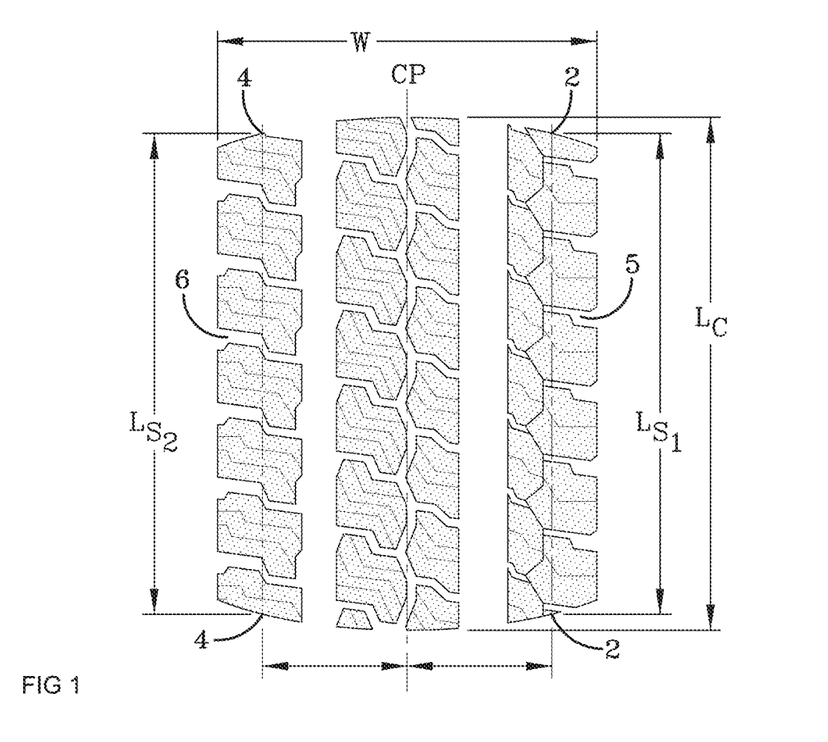
FIG. 1 is a schematic exemplary tire tread contact patch under normal load and inflation.
Figure 2:
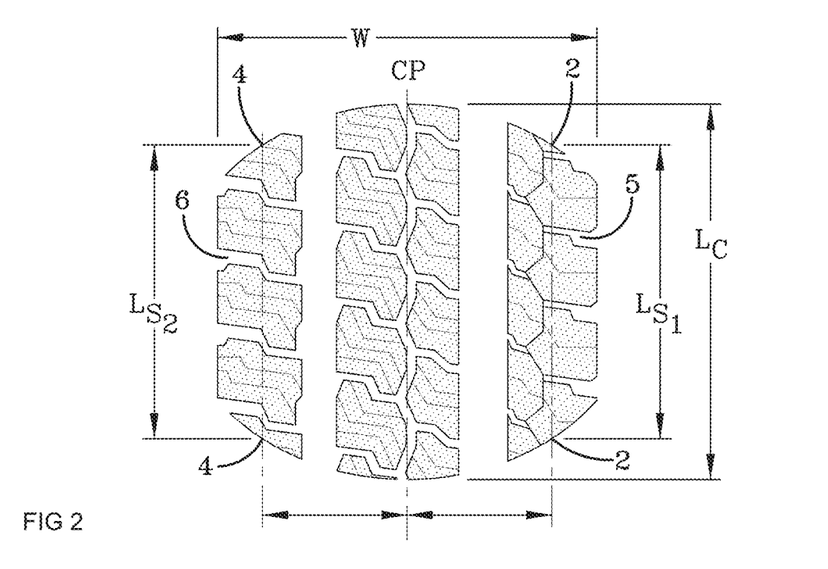
FIG. 2 is the schematic exemplary contact patch of FIG. 1 showing the contact patch at 50 percent load under normal inflation. Both FIGS. 1 and 2 provide illustrations for defining how footprint shape factors may be measured.

Conventionally, a butterfly shaped footprint has been undesirable. Alternatively, a footprint having a shape similar to the bow of a boat have been desirable for pushing water away from the center of the tread. As shown in FIGS. 1 and 2, conventional tires may exhibit this bow shaped of footprint.

Inherently, when the leading and trailing edges of the footprint are not axially extending (e.g., curved or bowed), as the tire rolls, a portion of the tread contacts the ground first and laterally adjacent tread elements follow. This may cause a phenomenon known as "tread element squirm." As the tread elements leave the treads footprint, the elements snap out of the contact patch as the pressure holding the element against the road is released. The elements lightly contacting the road are slid across the roadway wearing the element similar to sliding rubber eraser across a sheet of paper. These tread elements may have a uniform pressure distribution laterally across the tread and, more particularly, the leading and trailing edges of the footprint may be axially extending in a straight line path under all operating conditions.

A concept and methodology to define a footprint shape factor F is shown in prior art FIGS. 1 and 2. First, the maximum axial width W of the footprint may be measured. Then, the distance halfway between the maximum axial width W may be defined as the tire's centerplane CP. A distance 40% of the tread width (W) on each side of the centerplane may be located as shown as reference numerals 2, 4. A circumferential line 5, 6 may be drawn through points 2-2 and 4-4, respectively, and the lengths of lines $Ls_1$ and $Ls_2$ may be calculated, summed, and divided by 2 to arrive at an average shoulder length A. The footprint length $L_C$ at the centerplane may be measured. The footprint shape factor F may be the ratio of $L_C/L_S$. The footprint shape factor F of FIGS. 1 and 2 may be 1.12 at normal inflation and 100% load at a fixed pressure. At 50% load, the footprint shape factor F may be 1.50 at the fixed pressure. As shown, the footprint's shape may be very different at these different loads. In light truck tires, this variation in loading may be a greater challenge than in passenger tires.

An improvement in irregular tread wear has been be achieved by using lateral groove orientations that completely go against the conventional construction discussed above. Further, studies have confirmed the use of this tread pattern design while reducing heel toe wear dramatically in the shoulder tread elements thereby mitigating degradation in wet and/or dry traction performance.

A pneumatic passenger or light truck tire having a radially outer tread may have a plurality of tread elements defined by grooves arranged circumferentially and laterally around the tread between a pair of lateral tread edges to define a tread pattern. A plurality of tread elements may extend across the width of the tread between the lateral edges, including central tread elements and shoulder tread elements having leading and trailing tread edges. The shoulder tread elements may be arranged in two rows, one row adjacent each lateral edge. At least one row of shoulder elements may have the leading edges inclined relative to the direction of rotation of the tire having an axially outward portion of the leading edge entering and exiting a footprint contact patch prior to the axially inner portion of the leading edge of the shoulder tread elements. The leading edges of one row of shoulder elements may be oriented equally, but oppositely directed, relative to the leading edges of the other row. The leading edge of the shoulder tread elements may be inclined greater than 0 degrees or 10 degrees or greater relative to a plane perpendicular to the centerplane of the tire. The pneumatic tire may have a non-directional tread pattern wherein both rows of shoulder tread elements are directionally oriented in the same direction. The tread pattern may be directional having equal, but oppositely oriented, shoulder tread elements. The leading edges of each shoulder element may be equally oriented and the leading edge of each shoulder element may be inclined at an angle of 10 degrees or greater relative to a plane perpendicular to a centerplane of the tire.

Another pneumatic tire may have a directional tread pattern wherein the plurality of tread elements extend across the width of the tread between the lateral edges and include central tread elements and shoulder tread elements with each tread element having a leading edge and a trailing edge. A first line may extend along the leading edges of laterally adjacent central tread elements and have a generally "V" like or chevron shape laterally inward of the lateral edges extending to an apex where the apex of the "V" or chevron first enters a contact patch of the tire as it rotates in a forward direction prior to the remaining portions of the leading edges. The shoulder tread elements may be arranged in two circumferential rows, one adjacent each lateral edge, with the leading edges having an inclination directionally opposite to the leading edges of the central tread elements. A second line may extend along the leading edge of the shoulder elements and may be connected to the first line. Axially outer portions of the leading tread edge of each shoulder element may enter the contact patch prior to an axially inner portion of the leading edge of the shoulder elements. Upon exiting the contact patch, the axially outer portions of the shoulder elements may exit prior to the axially inner portions while the central tread elements may have the apex and axially inner portions of the central tread elements exit the central patch prior to axially outer portions. The directional tread may be symmetric or asymmetric about the centerplane of the tread.

SUMMARY OF THE INVENTION

A first pneumatic tire in accordance with the present invention has a radially outer tread. The tread has a plurality of circumferential grooves, a plurality of lateral grooves, and a plurality of shoulder grooves. The tread includes bottoms and sides of each circumferential groove being textured for improving snow traction, each circumferential groove being textured with flat-topped pyramids, bottoms and sides of each lateral groove being textured for improving snow traction; and bottoms and sides of each shoulder groove being textured for improving snow traction.

According to another aspect of the first pneumatic tire, the flat-topped pyramids have a height between 0.4 mm and 0.7 mm.

According to still another aspect of the first pneumatic tire, the flat-topped pyramids have a square top with width between 0.2 mm and 0.3 mm.

According to yet another aspect of the first pneumatic tire, each pyramid has four curved edges extending orthogonally a full height of each pyramid.

A second pneumatic tire in accordance with the present invention has a radially outer tread. The tread has a plurality of circumferential grooves, a plurality of lateral grooves, and a plurality of shoulder grooves. The tread includes bottoms only of each circumferential groove being textured for improving snow traction, bottoms only of each lateral groove being textured for improving snow traction, the bottoms of each lateral groove being textured with flat-topped pyramids; and bottoms only of each shoulder groove being textured for improving snow traction.

According to another aspect of the second pneumatic tire, the flat-topped pyramids have a height between 0.4 mm and 0.7 mm.

According to still another aspect of the second pneumatic tire, the flat-topped pyramids have a square top with width between 0.2 mm and 0.3 mm.

According to yet another aspect of the second pneumatic tire, each pyramid has four curved edges extending orthogonally a full height of each pyramid.

A third pneumatic tire in accordance with the present invention has a radially outer tread. The tread has a plurality of circumferential grooves, a plurality of lateral grooves, and a plurality of shoulder grooves. The tread includes sides only of each circumferential groove being textured for improving snow traction, sides only of each lateral groove being textured for improving snow traction; and sides only of each shoulder groove being textured for improving snow traction, the sides of each shoulder groove being textured with flat-topped pyramids.

According to another aspect of the third pneumatic tire, the flat-topped pyramids have a height between 0.4 mm and 0.7 mm.

According to still another aspect of the third pneumatic tire, the flat-topped pyramids have a square top with width between 0.2 mm and 0.3 mm.

According to yet another aspect of the third pneumatic tire, each pyramid has four curved edges extending orthogonally a full height of each pyramid.

DEFINITIONS

The following definitions are controlling for the disclosed invention.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structures" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Directional Tread Pattern" means a tread pattern designed for specific direction of rotation.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Groove" means an elongated void area in a tread that may extend circumferentially or laterally in the tread in a straight, curved or zigzag manner It is understood that all groove widths are measured perpendicular to the centerline of the groove.

"Lateral" means a direction going from one sidewall of the tire towards the other sidewall of the tire.

"Net to gross" means the ratio of the net ground contacting tread surface to the gross area of the tread including the ground contacting tread surface and void spaces comprising grooves, notches and sipes.

"Notch" means a void area of limited length that may be used to modify the variation of net to gross void area at the edges of blocks.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Sipe" means a groove having a width in the range of 0.2% to 0.8% of the tread width. Sipes are typically formed by steel blades having a 0.4 to 1.6 mm, inserted into a cast or machined mold.

"Tangential" and "Tangentially" refer to segments of circular curves that intersect at a point through which can be drawn a single line that is mutually tangential to both circular segments.

"Tread" means the ground contacting portion of a tire.

"Tread width" (TW) means the greatest axial distance across the tread, when measured (using a footprint of a tire,) laterally from shoulder to shoulder edge, when mounted on the design rim and subjected to a specified load and when inflated to a specified inflation pressure for said load.

"Void Space" means areas of the tread surface comprising grooves, notches and sipes.

BRIEF DESCRIPTION OF THE DRAWINGS

The present invention will be described by way of example and with reference to the accompanying drawings, in which.

DETAILED DESCRIPTION OF EXAMPLES OF THE PRESENT INVENTION

Figure 4:
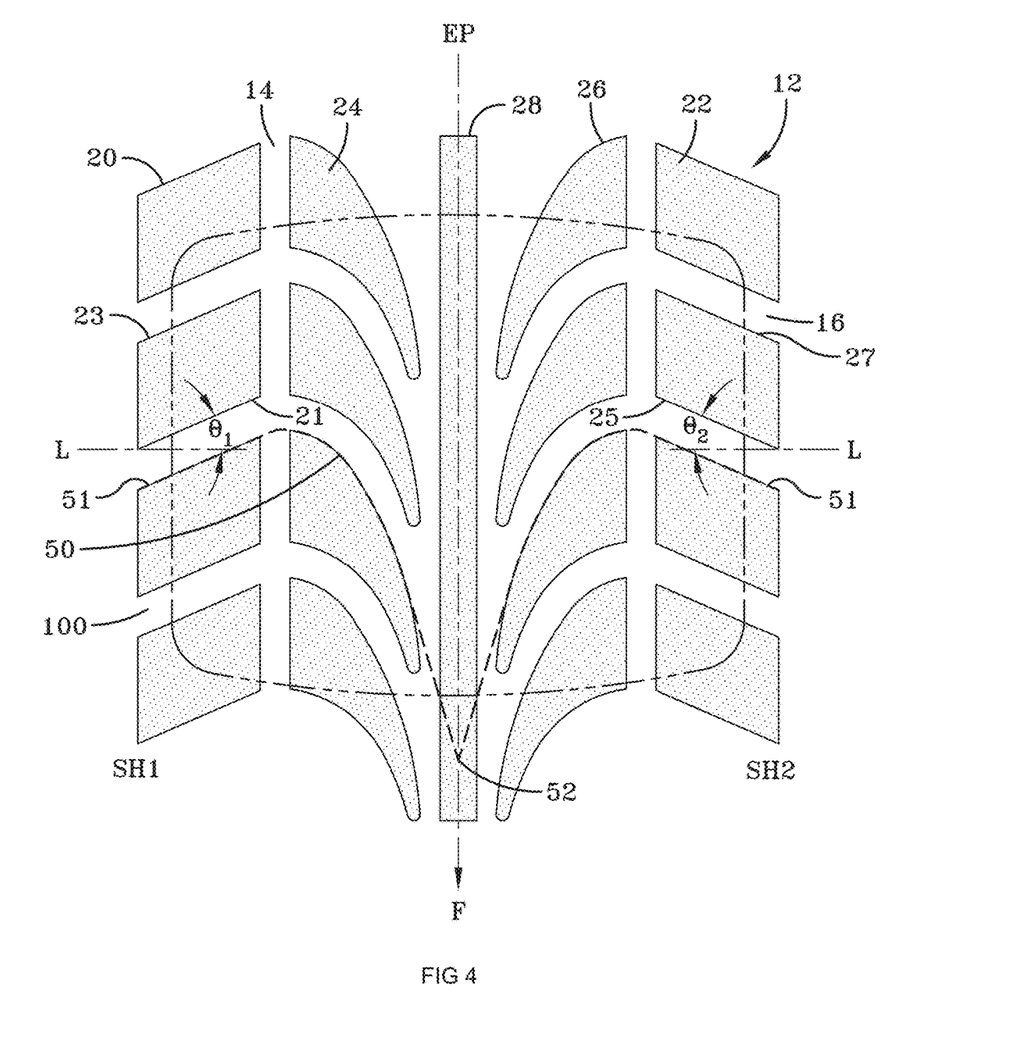
FIG. 4 is a schematic exemplary portion of another directional tread pattern.
Figure 4A:
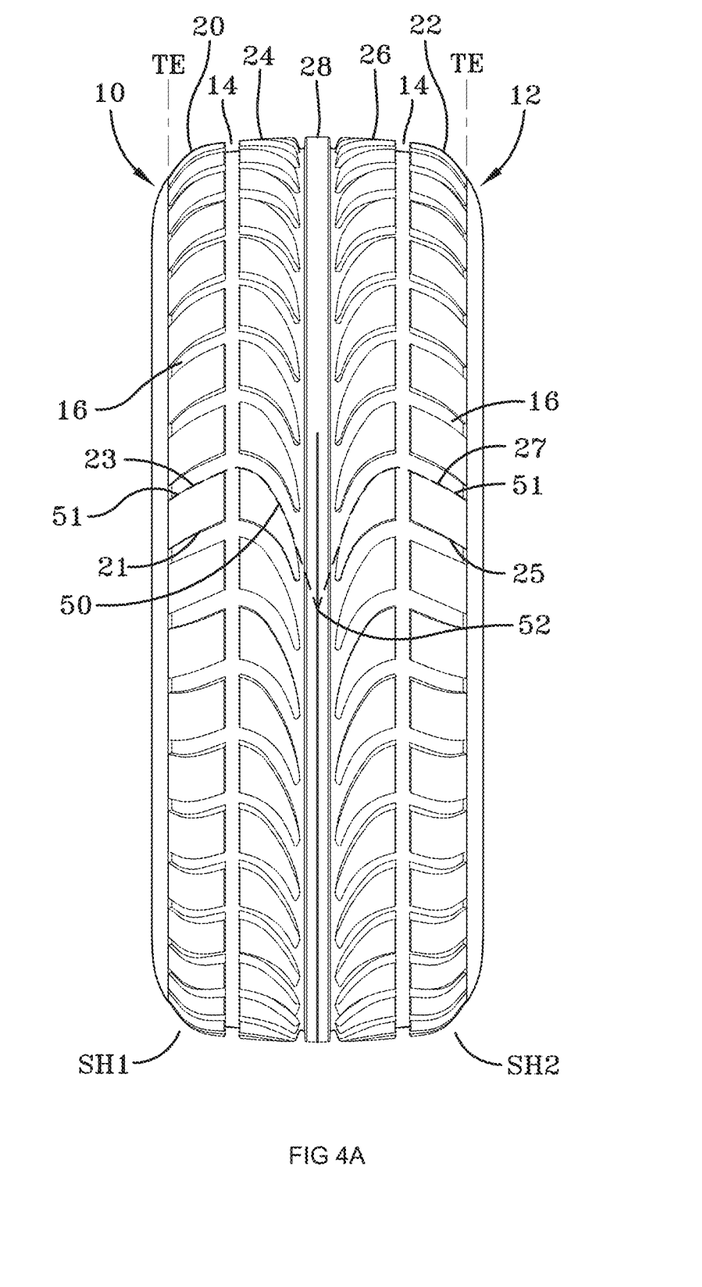
FIG. 4A is a plan view of a tire employing the tread shown in FIG. 4.

With reference to FIG. 4A, an example pneumatic passenger or light truck tire 10 may have a tread 12 which has a plurality of tread elements defined by grooves extending circumferentially and laterally around the tread between a pair of lateral tread edges TE to define a tread pattern. Such a tire may be inflated to pressures under normal load in a range of 28 psi to 45 psi. At these pressures, when the tire is lightly loaded, heel and toe wear may occur. By comparison, a heavy duty truck or bus tire may operate at inflated pressures of 80 psi to 120 psi at much higher loads. This tire may avoid heel and toe wear by using shoulder ribs for highway and paved road usage. Some tires may have block elements in the shoulders on rear drive tires, but front steer tires may have circumferentially continuous ribs to avoid vibration and tread wear issues.

As shown in FIGS. 4 and 4A, the tread 12 may have a plurality of tread elements extending across the width of the tread between the lateral edges TE including central tread elements 24, 26, 28. Tread elements 24, 26 may be identically shaped, but oppositely oriented. Tread element 28 may be a central rib circumferentially continuous and extending about the circumference of the tire. The tread 12 may further have a pair of shoulder tread elements arranged in rows. The first row SH1 may be defined by tread elements 20. The second row SH2 may be defined by tread elements 22. The shapes and orientation of these shoulder elements 20, 22 may further be defined by circumferential grooves 14 on each half of the tread 12, as well as curved lateral grooves 16 extending from a tread edge TE to the center portion of the tread, as shown. These grooves 16 may be curved in shape and extend along a line 50 from an apex 52 to the center of the tread element extending outwardly across the tread pattern changing direction along a second line 50 adjacent the shoulder tread elements 20, 22 and flow over the tread edge TE. The shoulder tread elements 20 may each have a leading edge 21 and a trailing edge 23, while the shoulder elements 22 may have a leading edge 25 and a trailing edge 27.

With further reference to FIG. 4, a footprint of a portion of the tread 12 may have a contact patch or footprint 100 as shown in a generally rectangular dashed line. This footprint shape or contact patch shape may be generally square. A square footprint may have a footprint shape factor F of approximately 1.25 or less. A more rounded footprint may have a shape factor of 1.5 or more. In this case, the central region may have been substantially longer in length while the lateral edges of the footprint may be shorter in length thereby creating an oval shape of the footprint.

The leading edge 21 of each shoulder element 20 in the first shoulder region SH1 may have an angle $\theta_1$, $\theta_1$ of the leading edge as shown by a straight line angle with the angle being measured from a perpendicular of the equatorial plane EP of the tire. The perpendicular line L may extend as either a line or a plane intersecting perpendicular to the equatorial plane EP. The angle $\theta_1$, as shown in the exemplary tire 10, may be 10 degrees or greater. On the opposite side of the tire 10, the shoulder row SH2 may have tread elements 22 with the leading edge 25 exhibiting an angle $\theta_2$. The angle $\theta_2$, as measured from the line L to the leading edge 25 may be equal, but opposite, to the angle $\theta_1$ on the opposite shoulder. The axially outer portions at the leading and trailing edges 25, 27 both may enter and exit the contact patch 100 prior to the axially inner portions of the leading and trailing edges. As the tire 10 rotates, the outer portions of the tread 12 may first come into contact with the contact patch 100. As the tire 10 continues to rotate, this leading axially outer portion of either the trailing or leading edges 25, 27 may exit first, while the axially inner portions of the leading and trailing edges may enter or leave the contact patch 100 following these axially outer portions. The axially extending grooves 16 may have a width of at least 0.060 inches, as defined by measuring perpendicularly between the leading and the trailing edges 25, 27. This width may allow the grooves 16 to remain open as they pass through the footprint 100 of the tire 10. This should not to be confused with a sipe, incision, or other narrow groove which may tend to close up as the tire 10 enters or leaves the footprint 100 of the tire. Thus, the leading and trailing edges 25, 27 may not be supported by an adjacent element nor may experience other influences regarding normal heel and toe wear.

All season tires may have these lateral grooves 16 extending at approximately 0 degrees relative to the line L. These lateral grooves 16 may be oriented at approximately 0 degrees. However, 0 degrees may not be an optimum orientation for the leading or trailing edges 25, 27 of the shoulder block elements 20, 22. Heel and toe wear may occur at this orientation. In some tread patterns similar to FIG. 4, the lateral groove 16 may flare out and continue a flow pattern opposite to the direction of forward travel thereby ejecting water outward and not directing water back towards the center of the tread 12. This may increase heel and toe wear and cause abrasion on leading and trailing edges 25, 27 of the shoulder block elements 20, 22.

Figure 5:
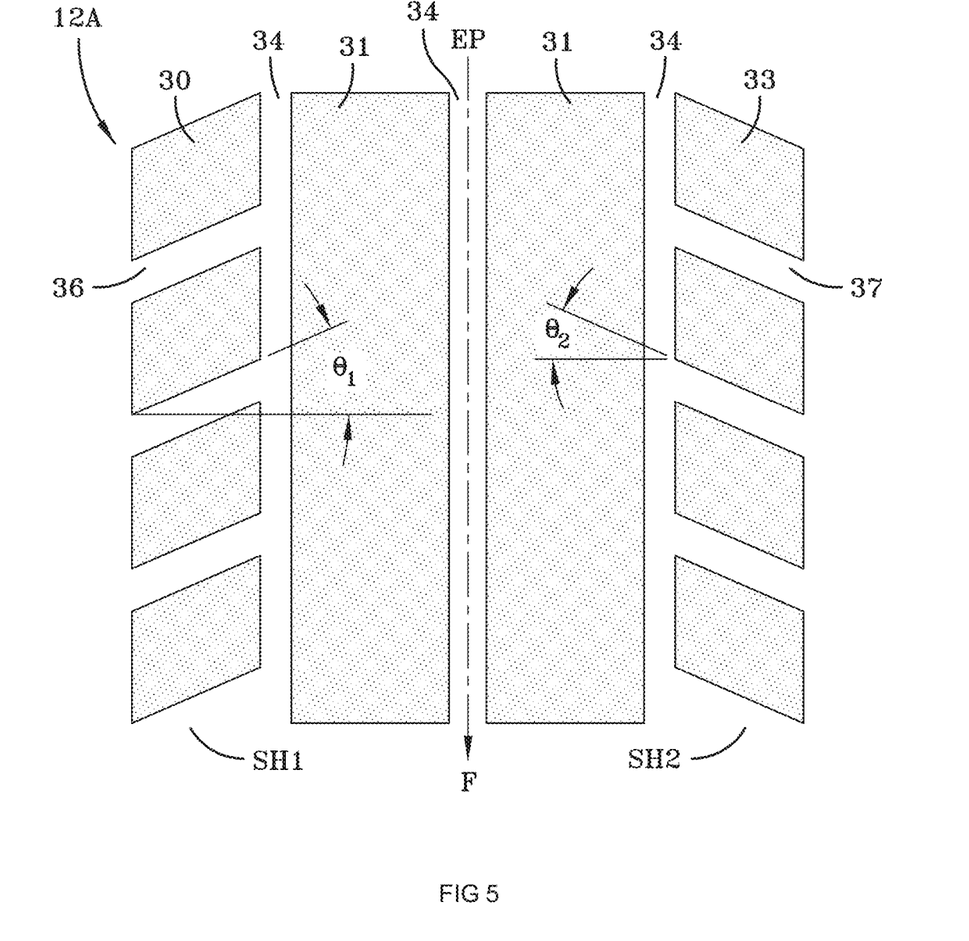
FIG. 5 is a schematic exemplary portion of another directional tread pattern.

These lateral grooves 16 may flow over the shoulder but actually changes its orientation as it approaches the shoulder such that the grooves are oriented in a fashion that is opposite to the more central regions of the tread elements 24, 26. This does not create a pushing of the water under wet traction conditions towards the center portion of the tread 12. However, the shoulder tread elements 20, 22 may be oriented such that the angle $\theta_1$ and $\theta_2$ may be as illustrated in FIGS. 4, 4A, and 5. These orientations, while inclined such that the axially outer portions of the tread elements 20, 22 enter and leave the contact patch 100 first, prior to the remaining axially inner portions of the shoulder tread elements, may mitigate heel and toe wear. Additionally, traction and traction performance of the tire 10 may be maintained.

With reference to FIG. 5, a tread pattern 12A may be similar to the tread pattern FIG. 4 with the exception that the center tread elements may be ribs 31 spaced by circumferentially continuous grooves 34. The angles $\theta_1$ and $\theta_2$ may be equal, but oppositely oriented relative, to the circumferential center plane or equatorial plane EP of the tire. The tread element 30 in the shoulder row SH1 may be spaced by inclined grooves 36 intersecting the circumferential grooves 34. On the opposite side, shoulder row SH2 may have lateral grooves 37 defining the tread elements 33. As discussed, the orientation of the leading and trailing edges may be equal, but opposite, such that an angle of inclination $\theta_1$ exists on the shoulder row SH1 whereas an angle $\theta_2$ equal, but opposite, exists on shoulder row SH2.

Figure 6:
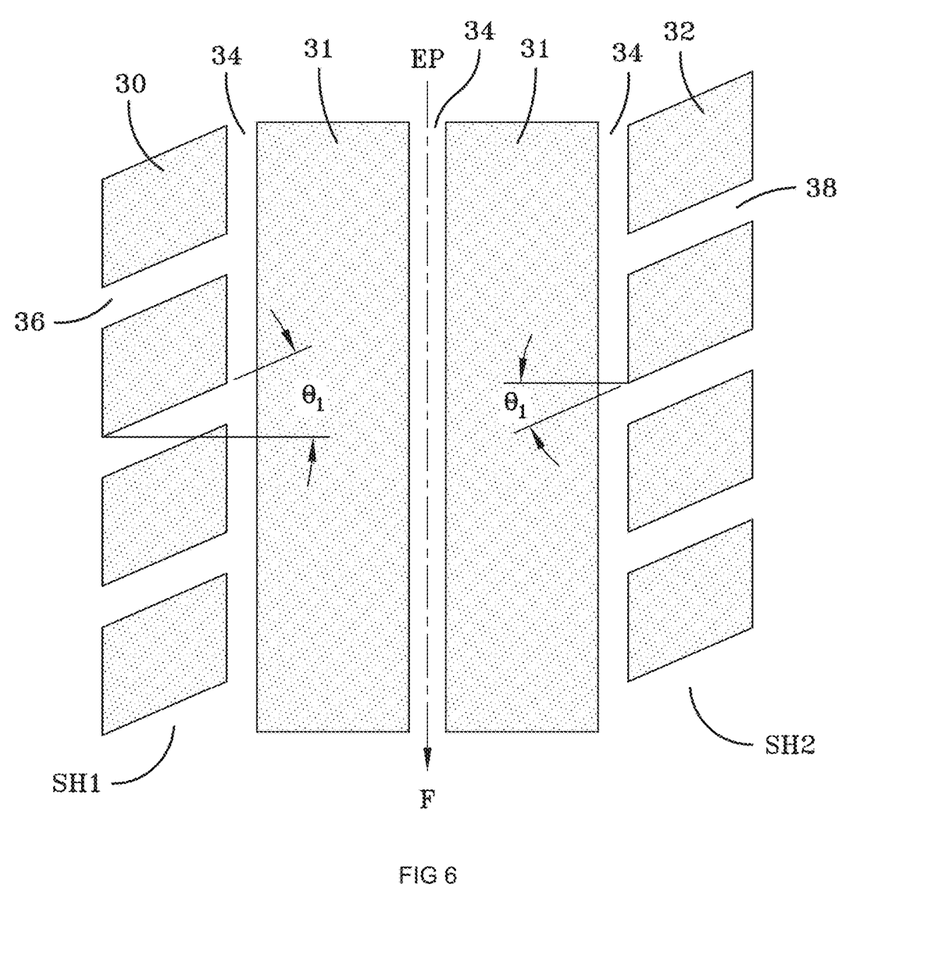
FIG. 6 is a schematic exemplary portion of a non-directional tread pattern.

With reference to FIG. 6, a tread pattern may be similar to the tread pattern FIG. 4 with the exception that the shoulder rows SH2 and the shoulder elements 32 are defined by lateral grooves 38 which intersect the circumferential grooves 34. In this case, both the shoulder elements SH1, SH2 have their leading and trailing edges of the shoulder elements inclined at an angle $\theta_1$, since both of the lateral grooves 38 extend in the same direction with the same orientation relative to the equatorial plane of the tire. The above tread features have been disclosed by U.S. Pat. No. 8,261,790, herein incorporated by reference.

As shown in FIGS. 7-14, texturing may be added to circumferential grooves and lateral grooves of a tire tread to improve snow performance for use with the present invention. As discussed above, it may be difficult to achieve snow performance improvement on all season tires without affecting other performances at the same time. However, the unique geometry of the present invention may be based on the tool path needed to manufacture the tire to create a texture which more closely matches the granularity of snow to better capture and grab the snow in the tires main circumferential grooves to improve the "snow-on-snow" shear for improved snow traction.

This texture may be applied to the main circumferential grooves of a tire tread. The texture may cover the base of the grooves, and completely or partially extend up the sides of the grooves. The texture may be placed only in the main circumferential grooves where the most snow compaction occurs and where it will not impact other performances. Conventionally, "smooth" or "polished" grooves have been used to expel slush and snow. The texture of the present invention acts oppositely, attracting and capturing snow to provide additional traction. The use of typical all season compounds and need for increased stiffness of the tread cap compound for good wet performance may negatively affect snow performance Relying on the tread compound only to improve snow performance may will also trade-off wet performance Use the surface roughness or texturing in the main circumferential grooves and/or on partial surfaces of the tread blocks or groove wall may not wear away over time. Thus, wet performance may not be negatively affected with wider and shallower grooves being textured to improve snow traction.

Figure 7:
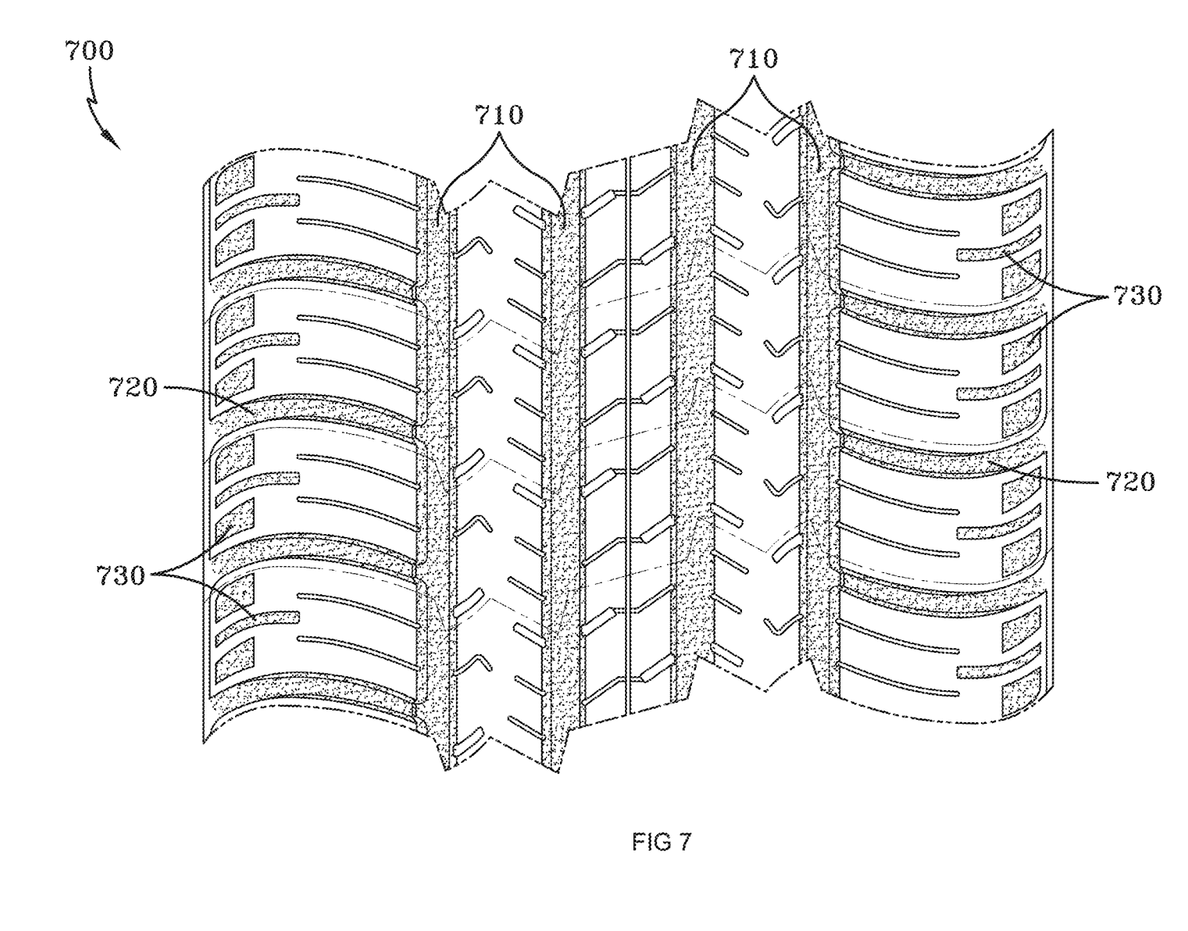
FIG. 7 shows a schematic example tread for use with the present invention.

FIG. 7 shows an example tread 700 for use with the present invention. The tread 700 has texturing or roughness added to the bottoms and sides of the circumferential grooves 710, the lateral grooves 720, and the shoulder grooves 730.

Figure 8:
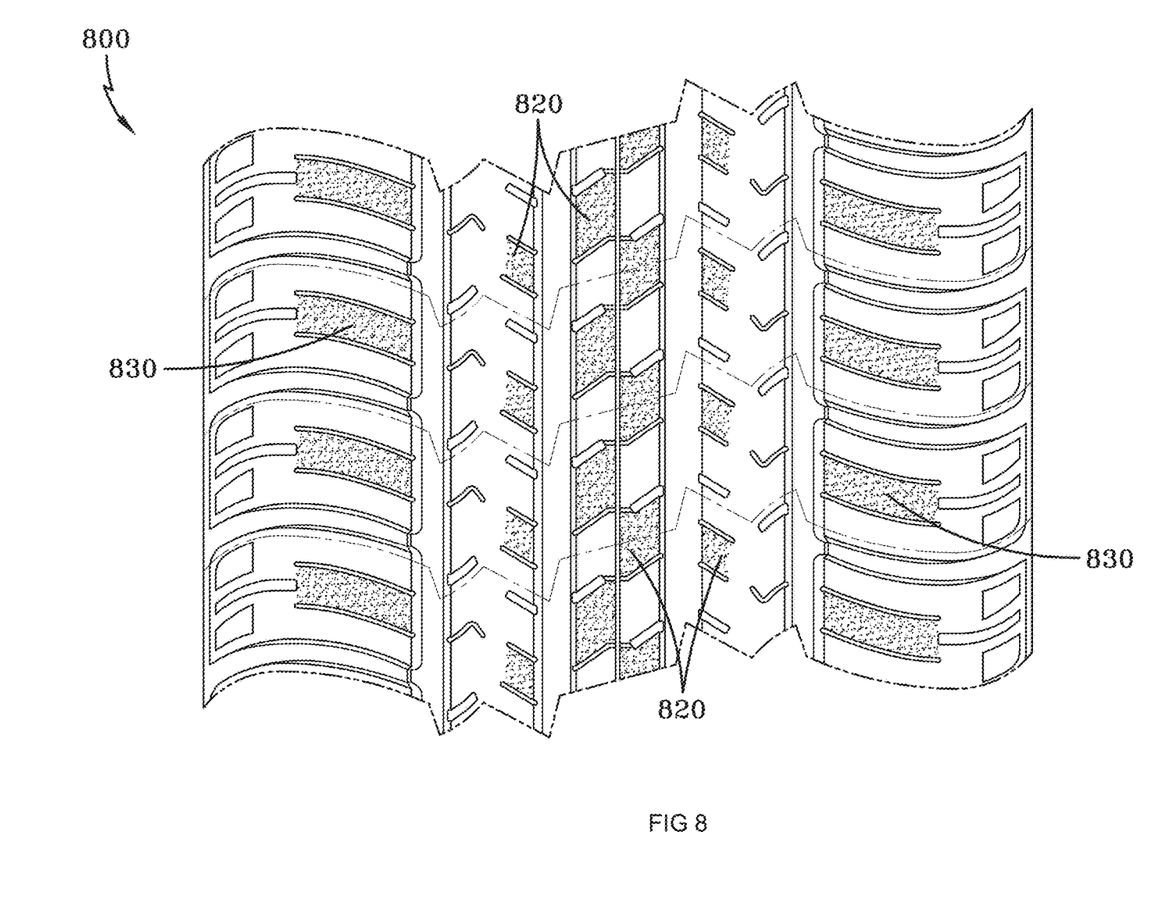
FIG. 8 shows another schematic example tread for use with the present invention.

FIG. 8 shows another example tread 800 for use with the present invention. The tread 800 has texturing or roughness added to selected areas of the tread, such as the areas 820 and the areas 830.

Figure 9:
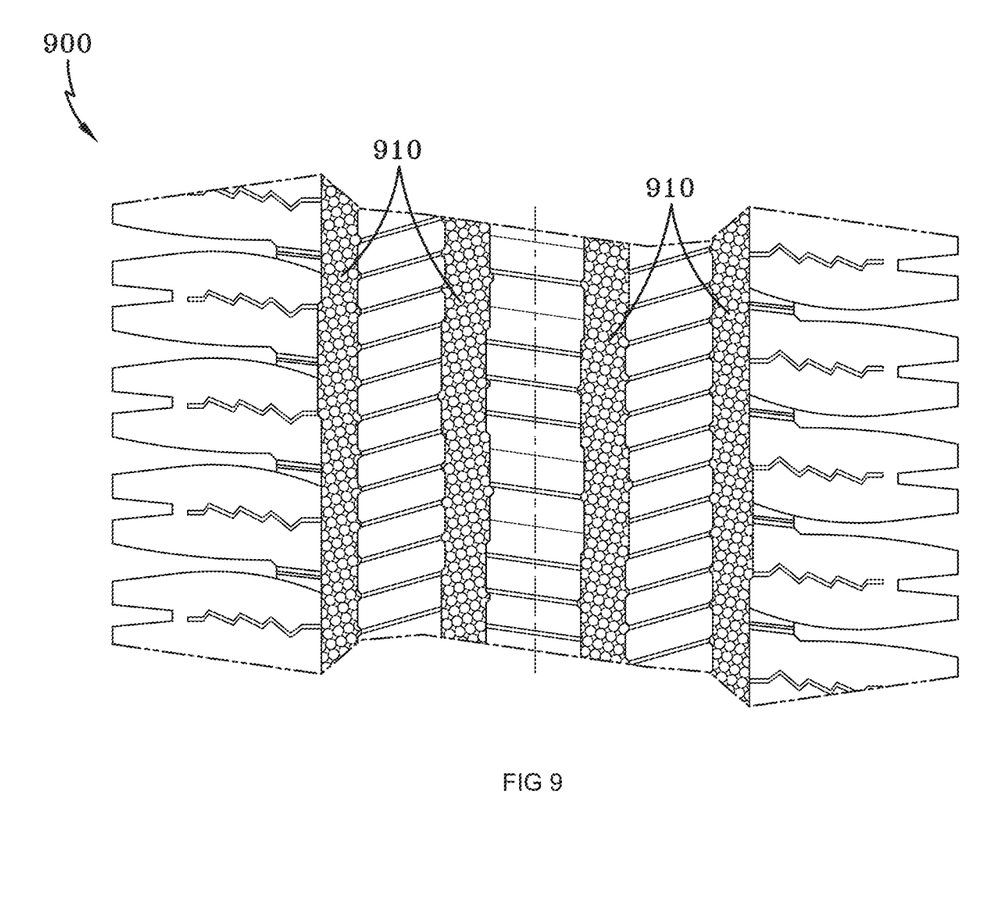
FIG. 9 shows still another schematic example tread for use with the present invention.

FIG. 9 shows still another example tread 900 for use with the present invention. The tread 900 has dimpled texturing or roughness added to the bottoms and sides of the circumferential grooves 910.

Figure 10:
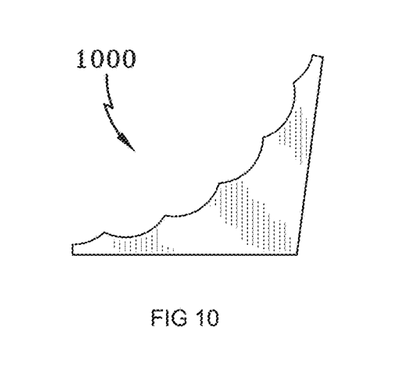
FIG. 10 shows a schematic example texturing or roughness of concave adjacent arcs for use with the present invention.
Figure 11:
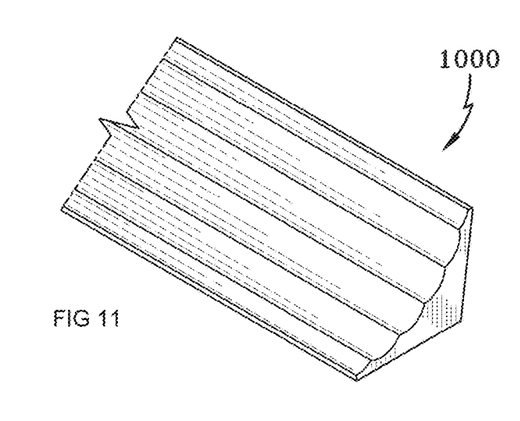
FIG. 11 shows the texturing of FIG. 10 from another perspective.
Figure 12:
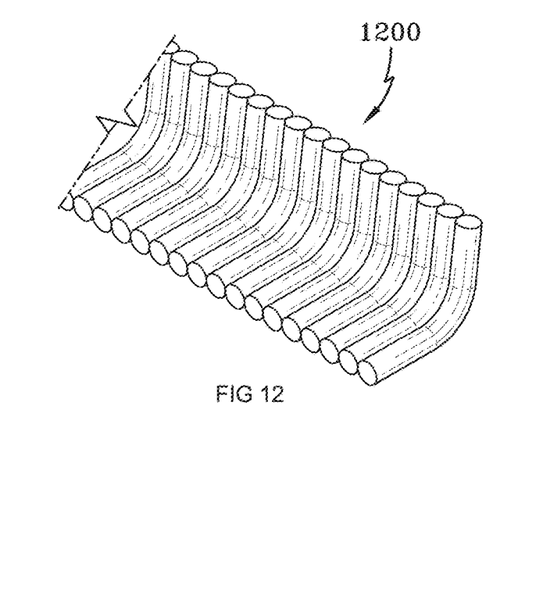
FIG. 12 shows another schematic example texturing or roughness of convex adjacent arcs for use with the present invention.
Figure 13:
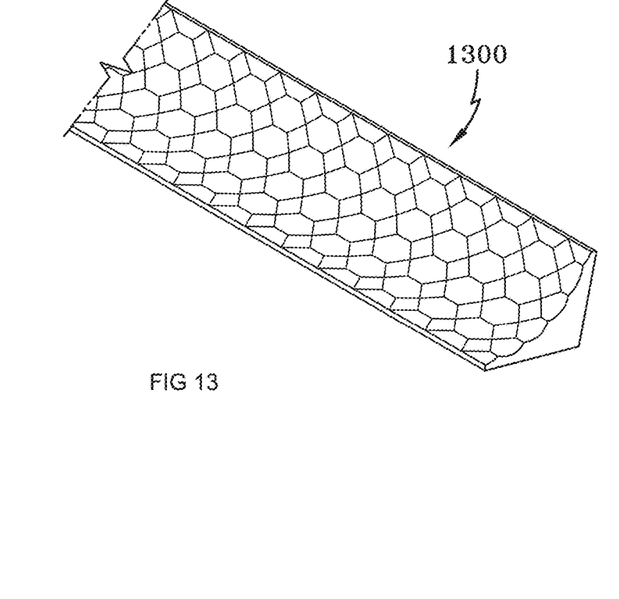
FIG. 13 shows still another schematic example texturing or roughness of concave adjacent spherical surfaces for use with the present invention.
Figure 14:
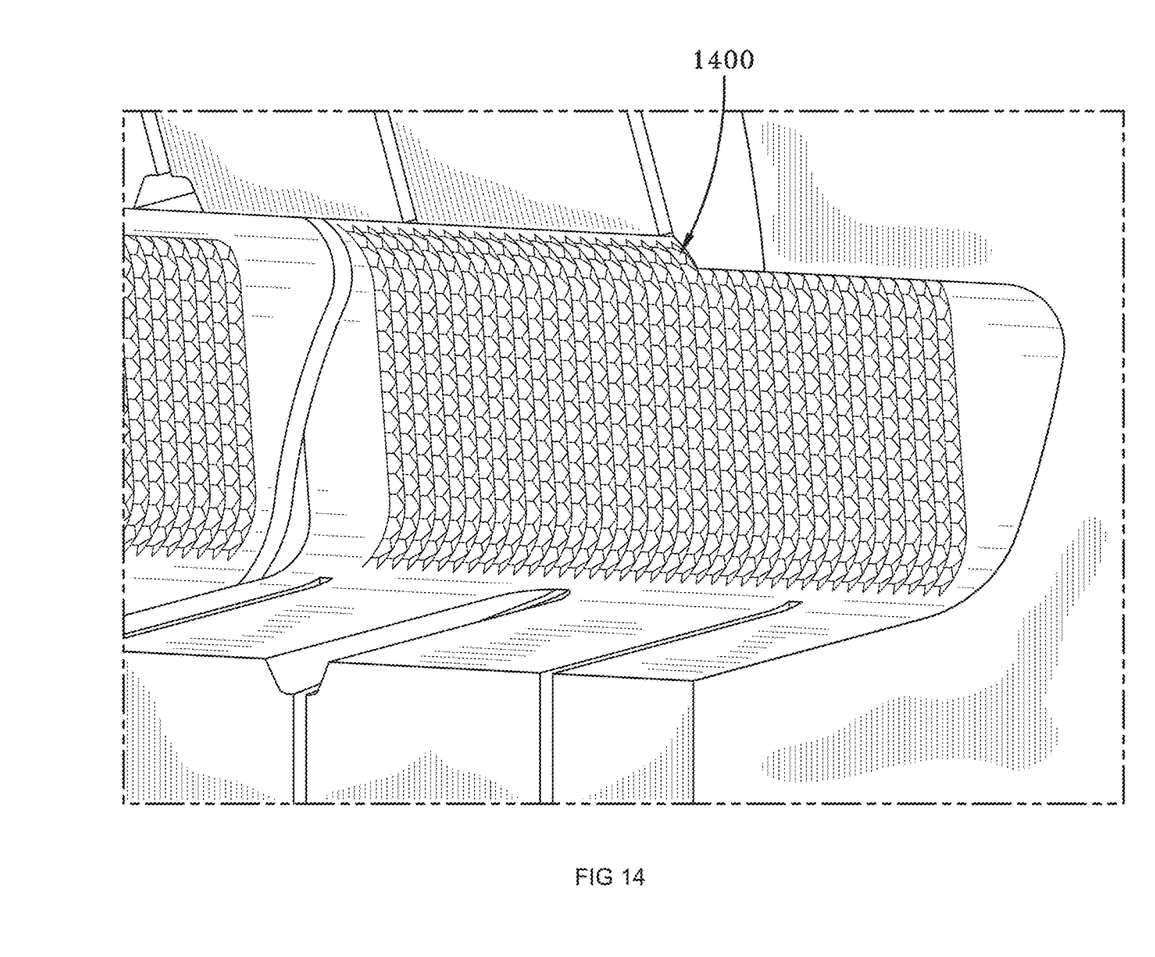
FIG. 14 shows yet another schematic example texturing or roughness of convex adjacent spherical surfaces for use with the present invention.

FIG. 10 shows an example texturing or roughness 1000 of concave adjacent arcs for use with the present invention. FIG. 11 shows the texturing of FIG. 10 from another perspective. FIG. 12 shows another example texturing or roughness 1200 of convex adjacent arcs for use with the present invention. FIG. 13 shows still another example texturing or roughness 1300 of concave adjacent spherical surfaces for use with the present invention. FIG. 14 shows yet another example texturing or roughness 1400 of convex adjacent spherical surfaces (similar to FIG. 9) for use with the present invention.

Figure 15:
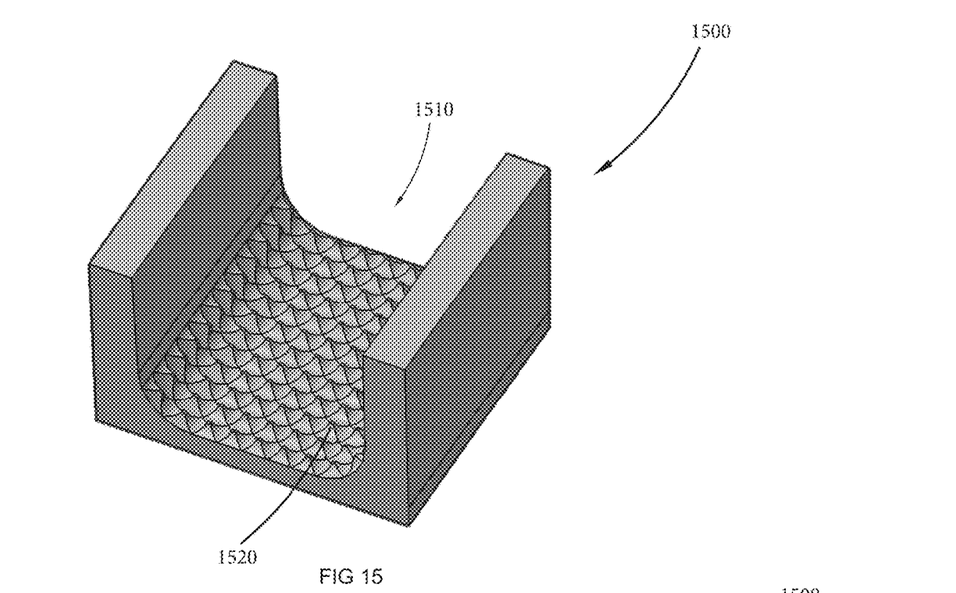
FIG. 15 shows a schematic example part of example texturing or roughness of extending flat-topped pyramids in accordance with the present invention.
Figure 16:
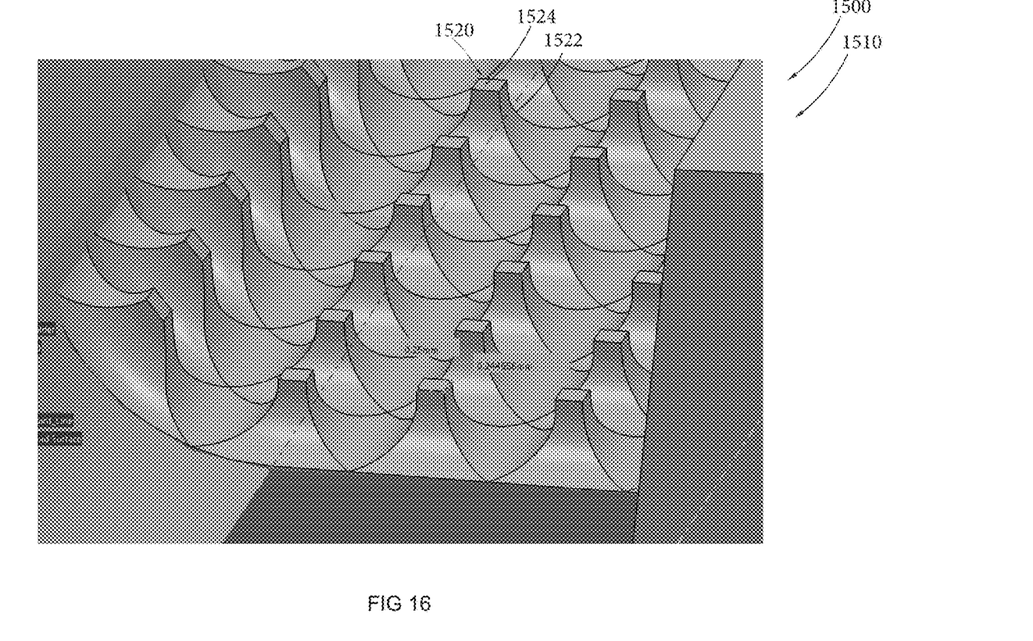
FIG. 16 shows a schematic detail of the texturing of FIG. 15.
Figure 17:
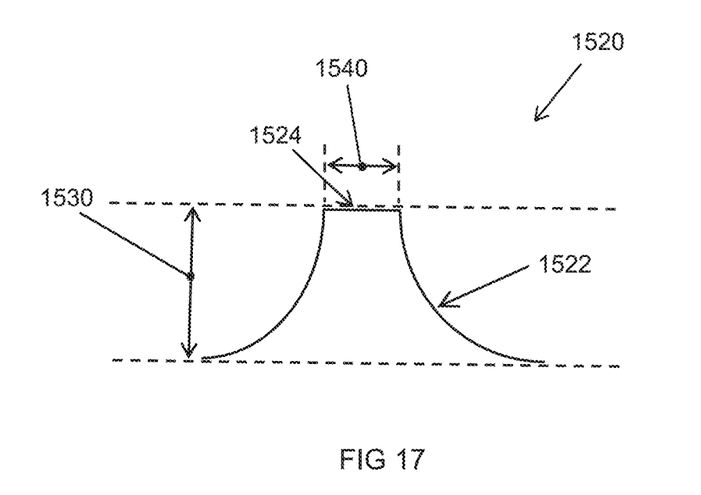
FIG. 17 shows a schematic side elevation view of one element of the texturing.

FIGS. 15-17 show part of an example tread 1500 in accordance with the present invention. The tread 1500 has orthogonally extending flat-topped pyramids 1520 added to the bottoms and sides of the grooves 1510. The unique geometry of these flat-topped, concave-edged pyramids 1520 may more closely match the granularity of snow to better capture and grab the snow in the grooves of the tire to thereby improve the "snow-on-snow" shear and the snow traction. The pyramids 1520 may be applied to only the circumferential grooves and/or all the grooves of the tread. The pyramids 1520 may be defined four concave edges 1522 extending orthogonally outward to the four corners of a flat, square top surface 1524. The pyramids 1520 may have a height 1530 of 0.4 mm to 0.7 mm and the top surface 1524 may have a square dimension 1540 of 0.2 mm to 0.3 mm.

Other variations in the present invention are possible in light of the description provided herein. While certain representative embodiments and details have been shown for the purpose of illustrating the present invention, it will be apparent to those skilled in this art that various changes and modifications may be made therein without departing from the scope of the present invention. It is, therefore, to be understood that changes may be made in the particular examples described herein which will be within the intended scope of the present invention as defined by the following appended claims.

What is claimed:

1. A pneumatic tire having a radially outer tread, the tread having a plurality of circumferential grooves, a plurality of lateral grooves, and a plurality of shoulder grooves, the tread comprising:

bottoms and sides of each circumferential groove being textured for improving snow traction, each circumferential groove being textured with flat-topped pyramids, the flat-topped pyramids having a height between 0.4 mm and 0.7 mm, the flat-topped pyramids having a square top with width between 0.2 mm and 0.3 mm, each of the flat-topped pyramids having four curved edges extending orthogonally a full height of each pyramid;

bottoms and sides of each lateral groove being textured for improving snow traction; and bottoms and sides of each shoulder groove being textured for improving snow traction.

* * * * *